United States Patent
Chow et al.

(10) Patent No.: US 7,559,006 B2
(45) Date of Patent: Jul. 7, 2009

(54) METHOD AND SYSTEM FOR INCORPORATING NON-REDUNDANT COMPONENTS IN A REDUNDANT SYSTEM IN A COMMUNICATIONS NETWORK

(75) Inventors: Joey M. W. Chow, Nepean (CA); Mark R. Megarity, Ottawa (CA); Richard Grieve, Ottawa (CA)

(73) Assignee: Alcatel Lucent, Paris (FR)

( * ) Notice: Subject to any disclaimer, the term of this patent is extended or adjusted under 35 U.S.C. 154(b) by 663 days.

(21) Appl. No.: 11/373,160

(22) Filed: Mar. 13, 2006

(65) Prior Publication Data

US 2007/0214401 A1   Sep. 13, 2007

(51) Int. Cl.
*G06F 11/00* (2006.01)
*H03M 13/00* (2006.01)
*G01R 31/08* (2006.01)

(52) U.S. Cl. .................. 714/776; 714/4; 370/216

(58) Field of Classification Search ............ 714/1, 714/2, 4, 25, 47, 746, 776; 370/216, 218; 709/224
See application file for complete search history.

(56) References Cited

U.S. PATENT DOCUMENTS

2006/0280117 A1* 12/2006 Gopinadhan et al. ........ 370/216
2006/0291378 A1* 12/2006 Brotherston et al. ........ 370/221

* cited by examiner

Primary Examiner—Shelly A Chase

(57) ABSTRACT

A method for incorporating a non-redundant component in a redundant system in a communications network, the redundant system having first and second redundant components providing first and second data streams and activity signals, respectively, the activity signals indicating which of the first and second data streams is an active data stream, the first and second data streams being unsynchronized, the method comprising: determining whether an activity switch has occurred from the activity signals; responsive to the determining, selecting an input data stream from among the first and second data streams; filtering the selected input data stream to produce an output data stream by nullifying any incorrect control information inserted into a packet in the input data stream due to the selecting; and, providing the output data stream to the non-redundant component.

20 Claims, 8 Drawing Sheets

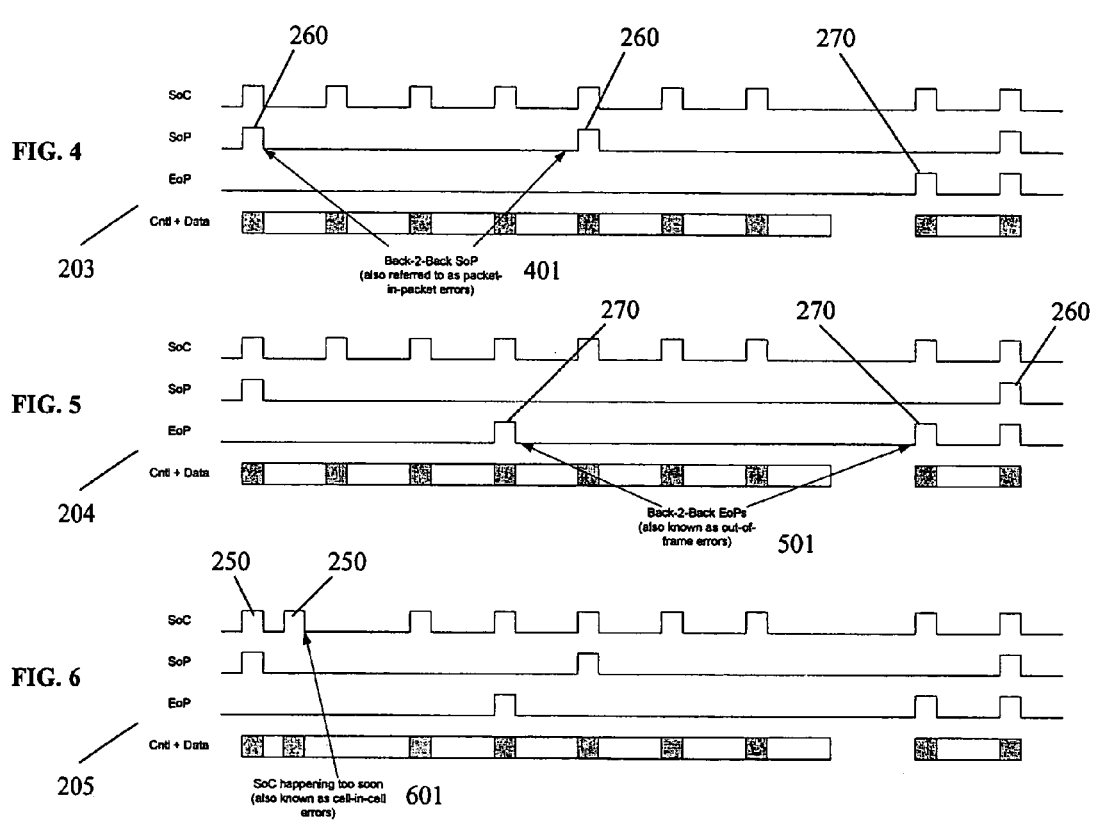

METHOD AND SYSTEM FOR INCORPORATING NON-REDUNDANT COMPONENTS IN A REDUNDANT SYSTEM IN A COMMUNICATIONS NETWORK

FIELD OF THE INVENTION

This invention relates to the field of redundant systems, and more specifically, to a method and system for incorporating non-redundant components in a redundant system in a communications network.

BACKGROUND OF THE INVENTION

In packet-switched networks, a router is a network device or, in some cases, software in a computer, that determines the next network point to which a packet should be forwarded toward its destination. The router is connected to at least two networks and decides which way to send each information packet based on its current understanding of the state of the networks it is connected to. A router is located at any gateway where one network meets another and is often included as part of a network switch.

Typically, packets are transported through a router by hardware and software operating in a data plane which is in turn controlled by hardware and software operating in a control plane. In general, the control plane includes the hardware and software that handles non-wire speed functions and data that are required to operate a network device or network. These functions include connection, setup, and tear down, operations, administration, and management. In general, the data plane includes the hardware and software that handles the classification, modification, scheduling, and transmission of wire-speed application data. The control and data planes maybe combined into a single processing plane. In addition, the processing plane may include the router's switch fabric.

To improve availability, a router may be equipped with redundant (i.e., two) control, data, or processing planes. A first control plane, for example, is designated as the active control plane and a second control plane is designated as the inactive control plane. In the event that a device in the active control plane fails, the inactive control plane takes over to reduce down time and hence maintain availability of the router. In such a case, activity is said to switch from the active control plane to the inactive control plane, that is, the two planes exchange roles. Routers and other network devices having redundant systems (i.e., control or data plane devices) are often referred to as "high availability" systems. Thus, a typical high availability router may have two main processing cards that run the same software and perform the same operation. If one card fails in the field, the other card takes over in order to keep the router up and running. Such a router is highly available as the card redundancy ensures that the router is almost always operable or available.

Thus, in a redundant or high availability system, two redundant control planes or cards typically run the same software as mentioned above. Even if both control plane cards are running, the system is still one system and therefore only one control card can configure and operate the system. This one card is the active card. The other card remains in a standby mode monitoring what is going on within the system. It is the inactive card. If the active card fails, then the inactive card takes over and becomes the active card. This is an activity switch. An activity switch can occur due to a failure of the active card, but it is also possible to trigger an activity switch by removing the active card from the system to perform an upgrade, for example. An activity switch may also be generated by entering a software command.

When designing a redundant system, the use of parts or components that were not originally designed for redundancy may be required. Such parts or components may be referred to as non-redundant parts or components. This requirement may be due to a number of reasons which may include availability and cost advantages of the non-redundant parts. However, one problem with using parts that were not designed for redundancy is that such parts may not behave properly or as expected during activity switches. For example, non-redundant parts may not be able to handle the corrupted data that they will typically receive during an activity switch. As such, the use of non-redundant parts may result in unexpected behaviour leading to catastrophic events such as device lock-ups and unpredictable data loss. Avoidance of such catastrophic events is clearly desirable. Consequently, non-redundant parts have been incorporated in redundant systems through the use of a monitoring device that functions to detect a catastrophic event and reset the non-redundant parts to a known good state. However, such methods typically take significant time to recover from a fault and hence cause much inconvenience to end users.

A need therefore exists for an improved method and system for incorporating non-redundant components in redundant systems such as high availability routers. Accordingly, a solution that addresses, at least in part, the above and other shortcomings is desired.

SUMMARY OF THE INVENTION

According to one aspect of the invention, there is provided a method for incorporating a non-redundant component in a redundant system in a communications network, the redundant system having first and second redundant components providing first and second data streams and activity signals, respectively, the activity signals indicating which of the first and second data streams is an active data stream, the first and second data streams being unsynchronized, the method comprising: determining whether an activity switch has occurred from the activity signals; responsive to the determining, selecting an input data stream from among the first and second data streams; filtering the selected input data stream to produce an output data stream by nullifying any incorrect control information inserted into a packet in the input data stream due to the selecting; and, providing the output data stream to the non-redundant component.

The method may further include determining whether any incorrect control information has been inserted into the packet. The nullifying may comprise blocking one or more control indications in packets being transmitted during the activity switch. The nullifying may comprise, if the incorrect control information pertains to a first start of packet indication followed by a second start of packet indication, inserting an end of packet indication between the first and second start of packet indications. The nullifying may comprise inserting abort information in the output data stream to instruct the non-redundant component to discard one or more packets. The nullifying may comprise, if the incorrect control information pertains to a first end of packet indication followed by a second end of packet indication, discarding packets until a start of packet indication is received. The redundant system may be a router, switch, or gateway. The non-redundant component may be an input/output device. The non-redundant component may be a buffer management device, network processor, Ethernet device, physical layer device, framer device, or first-in-first-out ("FIFO") device. And, the packet may be an Internet Protocol ("IP") packet, a multiprotocol label switching ("MPLS") packet, an asynchronous transfer mode ("ATM") packet, or a packet of another cell/packet format.

In accordance with further aspects of the present invention there is provided an apparatus such as a data processing system, a method for adapting this system, as well as articles of manufacture such as a computer readable medium having program instructions recorded thereon for practising the method of the invention.

BRIEF DESCRIPTION OF THE DRAWINGS

Features and advantages of the embodiments of the present invention will become apparent from the following detailed description, taken in combination with the appended drawings, in which:

FIG. 4 is a diagram illustrating a back-to-back start of packet error in a data stream;

FIG. 5 is a diagram illustrating a back-to-back end of packet error in a data stream;

FIG. 6 is a diagram illustrating a cell-in-cell error in a data stream;

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the adaptor card described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

The present invention provides a method and system that allows for the effective and reliable use of non-redundant parts in a redundant system. According to the present invention, a data stream in a redundant system is modified to ensure its integrity to downstream non-redundant parts thus allowing the non-redundant parts to operate without interruption and without causing failures or catastrophic events. The present invention allows for the use of simpler and less expensive non-redundant parts in redundant systems. Redundant systems using parts and design elements not designed for redundancy would benefit from the present invention.

Figure 1:
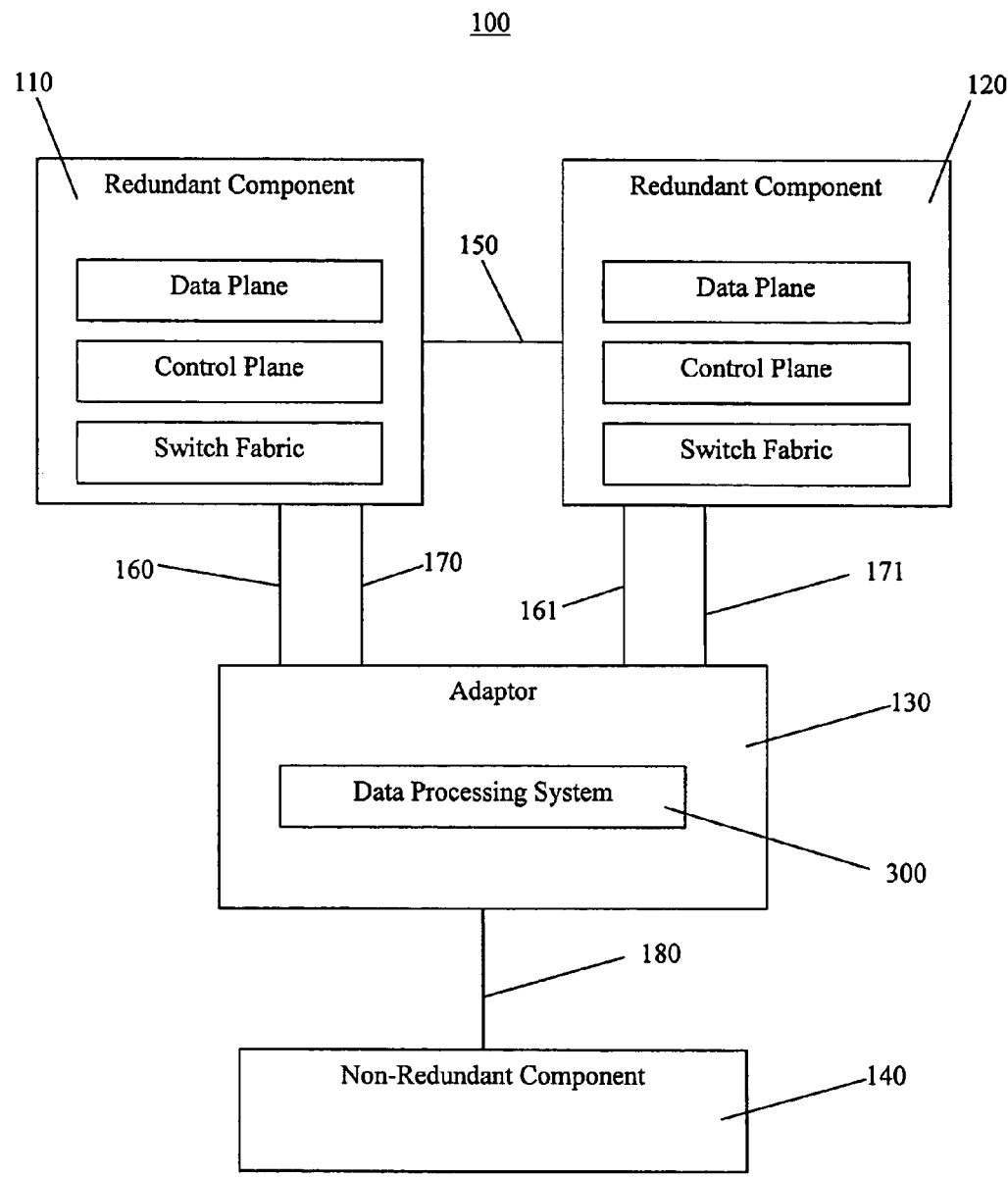
FIG. 1 is a block diagram illustrating a redundant system having redundant components, one or more adaptor cards, and one or more non-redundant components in accordance with an embodiment of the invention.

FIG. 1 is a block diagram illustrating a redundant system 100 having redundant components 110, 120, one or more adaptor cards 130, and one or more non-redundant components 140 in accordance with an embodiment of the invention. The redundant components 110, 120 may each contain data plane, control plane, and switch fabric functionality. The redundant components 110, 120 may be coupled by a control link 150 which is used by the redundant components 110, 120 to determine which of them is the active component and which is the inactive component. Coupled to each of the redundant components 110, 120 is an adaptor card 130. The adaptor card 130 receives a data stream and an activity signal from each of the redundant components 110, 120 over appropriate data 160, 161 and control links 170, 171. The non-redundant component 140 is coupled to the adaptor card 130 by an appropriate data link 180 and receives a single filtered output data stream over this link 180. Typically, the non-redundant component 140 is an input/output ("I/O") device. The adaptor card 130 includes a data processing system 300 which will be described below.

Figure 2:
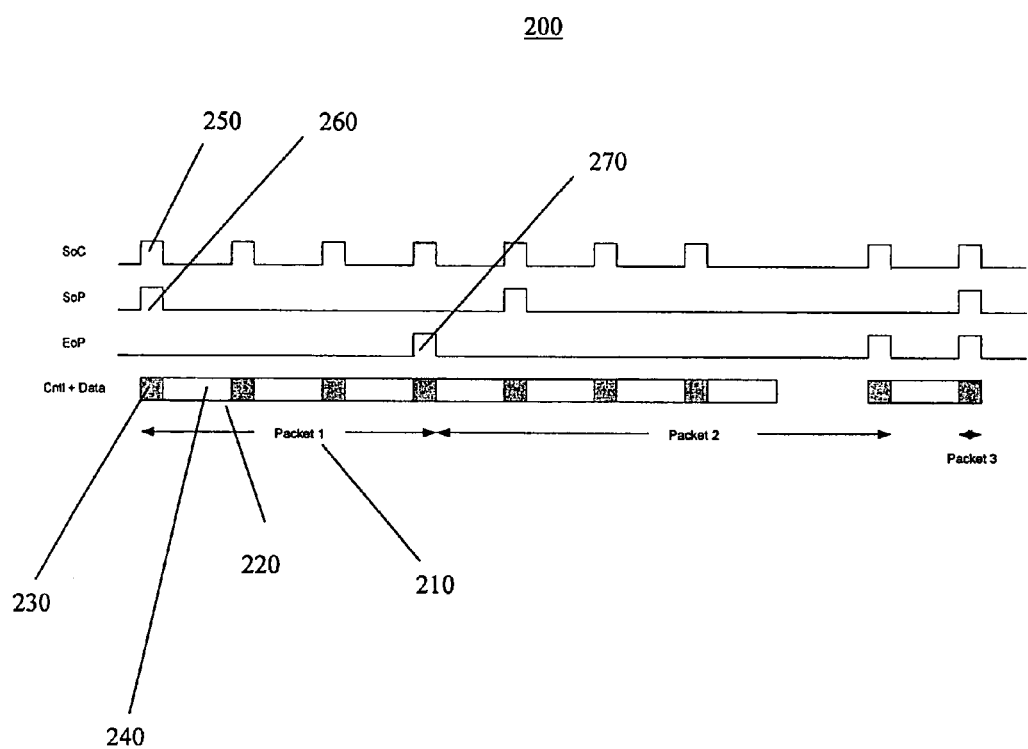
FIG. 2 is a diagram illustrating a non-redundant data stream.

FIG. 2 is a diagram illustrating a non-redundant data stream 200. The data stream 200 includes packets 210 which are composed of cells 220. Each cell 220 includes control information 230 and data 240. The control information 230 includes a start of cell indication ("SoC") 250 (when asserted additional control information 230 is also valid along with the packet data 240), a start of packet indication ("SoP") 260, and an end of packet indication ("EoP") 270. In general, the packet 210 is a bundle of data organized in a specific way for transmission. The specific native protocol of the communications network may term the packet as a packet, block, frame, or cell. Thus, the packet 210 includes the data 240 to be transmitted and certain control information 230 such as a start of packet indication 260 and an end of packet indication 270. The control information 230 may also include synchronizing bits, address of the destination or target device, address of the originating device, length of packet, error detection bits, abort information, packet priority, correction bits, etc. The data 240 or payload includes the data to be transmitted and may be of fixed length (e.g., an ATM cell) or variable length (e.g., an Ethernet frame). Note that a correct data stream consists of properly delineated SoC indications with a single SoP indication at the start of the packet followed by a single EoP indication at the end of the packet.

Figure 3:
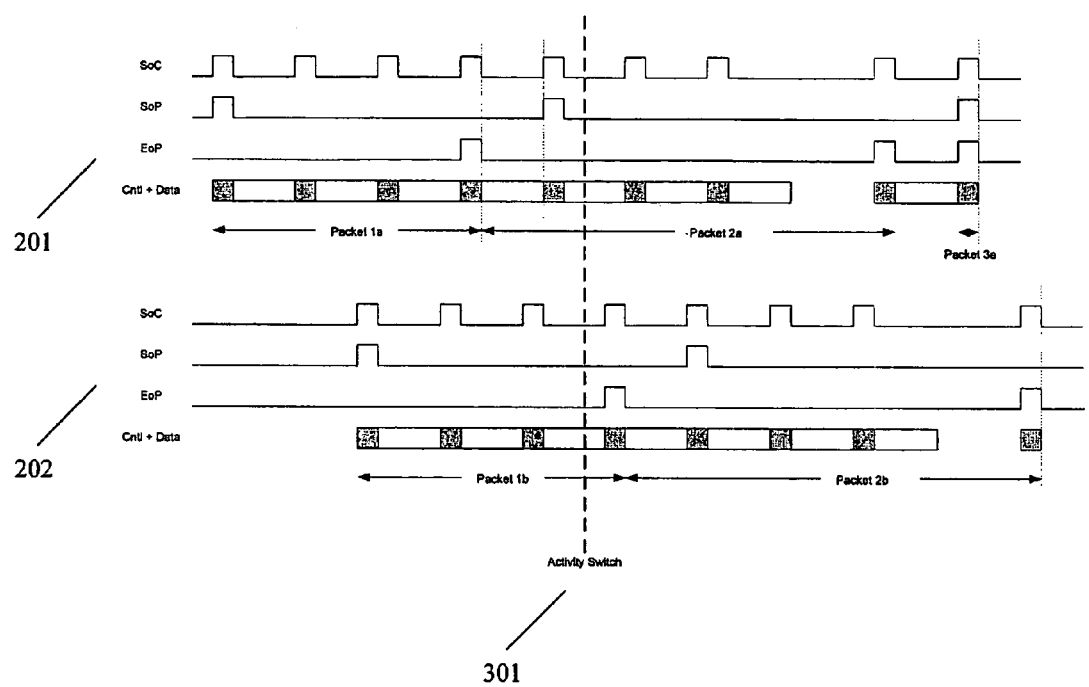
FIG. 3 is a diagram illustrating redundant data streams and the occurrence of an activity switch.

FIG. 3 is a diagram illustrating redundant data streams 201, 202 and the occurrence of an activity switch 301. The redundant data streams 201, 202 may be transmitted on the redundant data links 160, 161 of the redundant system 100. In a redundant system 100, there are two data streams 201, 202, one from each of the redundant components 110, 120. Since the redundant components 110, 120 operate independently, their data streams 201, 202 are not necessarily synchronized as shown in FIG. 3. When a non-redundant device 140 is receiving the first data stream (e.g., 201) and an activity switch occurs 301, the non-redundant device 140 will begin receiving the second data stream (e.g., 202). However, due to the lack of synchronization between the data streams 201, 202, the control information 230 and/or data 240 may be corrupted due to the activity switch 301.

FIGS. 4-6 are diagrams illustrating corrupted data streams 203, 204, 205 resulting from an activity switch 301 in a redundant system 100. The packet or data stream errors 401, 501, 601 shown in FIGS. 4-6 can adversely affect a non-redundant device 140 if not nullified or corrected. In FIG. 4, a back-to-back SoP error 401 is illustrated. This error is also known as a packet-in-packet error. In this error, a first SoP indication 260 is followed by a second SoP indication 260 before the occurrence of an EoP indication 270. In FIG. 5, a back-to-back EoP error 501 is illustrated. This error is also know as an out-of-frame error. In this error, a first EoP indication 270 is followed by a second EoP indication 270 before the occurrence of a SoP indication 260. In FIG. 6, a cell-in-cell error 601 is illustrated. In this error, a second SoC indication 250 follows too soon after a first SoC indication 250.

Figure 7:
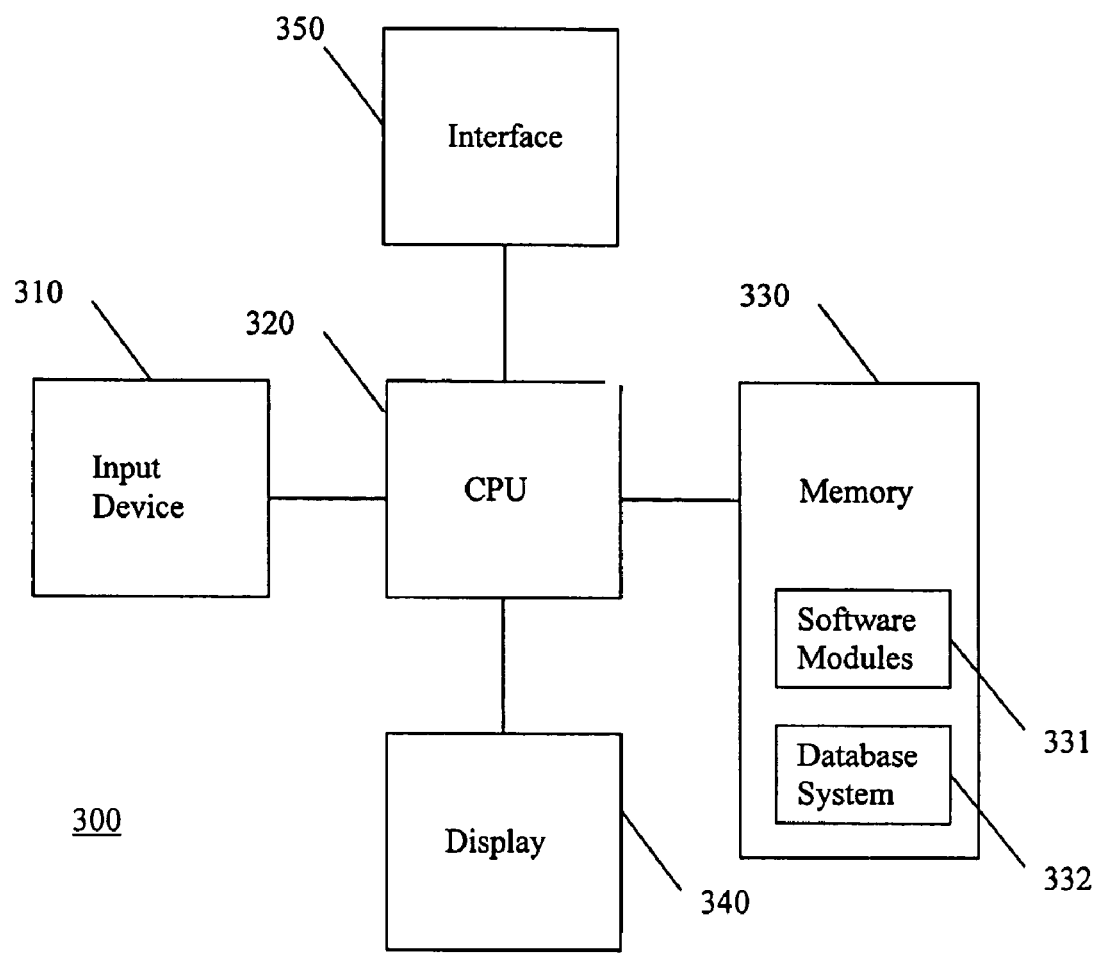
FIG. 7 is a block diagram illustrating a data processing system adapted to implement an embodiment of the invention.

FIG. 7 is a block diagram illustrating a data processing system 300 adapted to implement an embodiment of the invention. The data processing system 300 is suitable for operation in or in conjunction with the adaptor card 130 of FIG. 1. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection and/or bus connection. The input device 310 may include a keyboard, a mouse, a trackball, or a similar device. And, the display 340 may include a computer screen, terminal device, or a hard-copy producing output device such as a printer or plotter. The data processing system 300 is adapted for communicating with other data processing systems (e.g., 110, 120, 130, 140) via the interface device 350. The data processing system 300 may include a database system 332 for storing and accessing network topology and programming information. The database system 332 may include a database management system ("DBMS") and a database and is stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

Thus, the data processing system 300 includes computer executable programmed instructions for directing the system 300 to implement the embodiments of the present invention. The programmed instructions may be embodied in one or more software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable, signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

Now, the present invention provides a method to use non-redundant components 140 in a redundant system 100 while maintaining the components 140 in an operational state even during activity switches 301 where incoming packets 210 or data 240 may be corrupted 401, 501, 601. The non-redundant components 140 may include buffer management devices, network processors, Ethernet devices (i.e., having media access control ("MAC") interfaces), physical layer devices, framer devices, and first-in-first-out ("FIFO") devices. The non-redundant components 140 are typically designed to accept non-redundant data streams (e.g., 200) and additional logic is generally not included to handle corrupted data streams (e.g., 203, 204, 205) that may result upon the occurrence of an activity switch 301.

According to one embodiment, a method is provided for filtering an input corrupted data stream 203, 204, 205 so that it approximates a non-corrupted data stream (e.g., non-redundant data stream 200) after the occurrence of an activity switch 301. By doing so, corrupted data and offending data patterns 401, 501, 601 that may cause catastrophic failure events are nullified, reduced, or eliminated.

The activity switch 301 is signalled through a mechanism typically initiated by software on each of the active and inactive redundant cards 110, 120. The adaptor card 130, which is the card that receives traffic 201, 202 from both active and inactive redundant cards 110, 120, receives activity switch signals (i.e., on links 170, 171) and performs a final determination with respect to activity based on a number of rules to ensure the accuracy of the received information and to account for potential fault conditions.

Once it has been determined that an activity switch 301 has occurred, the selected input data steam 203, 204, 205 to the adaptor card 130 is modified by filtering out offending data patterns and control signals 401, 501, 601 (e.g., that occur as a result of the activity switch 301). Control signals and data patterns can include SoP and EoP indications 260, 270 as well as packet length information. These control signals are typically used to delineate packet boundaries so that they are properly processed by downstream devices (e.g., 140). When these control signal are corrupted, the downstream devices 140 may get confused as to what is being received, resulting in a catastrophic event such as a system or device lock-up. As described above, a corrupted input data stream 203, 204, 205 may include two back-to-back SoP indications 401 which may confuse the downstream device 140 which expects a SoP indication 260 to be always followed by an EoP indication 270.

As mentioned, the selected input data stream 203, 204, 205 is filtered by the adaptor card 130 to remove the offending control signals that may adversely affect the downstream device 140. According to one embodiment, one or more of the following techniques may be used to filter or clean a data stream 203, 204, 205 corrupted by an activity switch 301 to produce a filtered output data stream (i.e., on link 180) that appears as a normal non-redundant data stream (e.g., 200) to a non-redundant down-stream device 140:

a) Corrupt control signals (e.g., 601) are blocked during a cell (or packet) segment when an activity switch occurs 301;

b) Back-to-back SoP indications 401 are eliminated by inserting an EoP indication 270;

c) Special abort information may be inserted to instruct the downstream device 140 to discard a packet; and, d) Packets are discarded when back-to-back EoP indications 501 occur and do not resume until a SoP indication 260 is received.

The present invention provides several advantages. First, it allows for the use of lower cost non-redundant components 140 in a redundant system 100 and allows those non-redundant components 140 to maintain their operational state during activity switches. Second, it allows less fault tolerant and hence lower cost non-redundant components 140 to be used in a redundant system 100 thereby lowering overall system costs. Since non-redundant components 140 may also be simpler in design when compared to redundant components 110, 120, overall system reliability and time to market may be improved.

Figure 8:
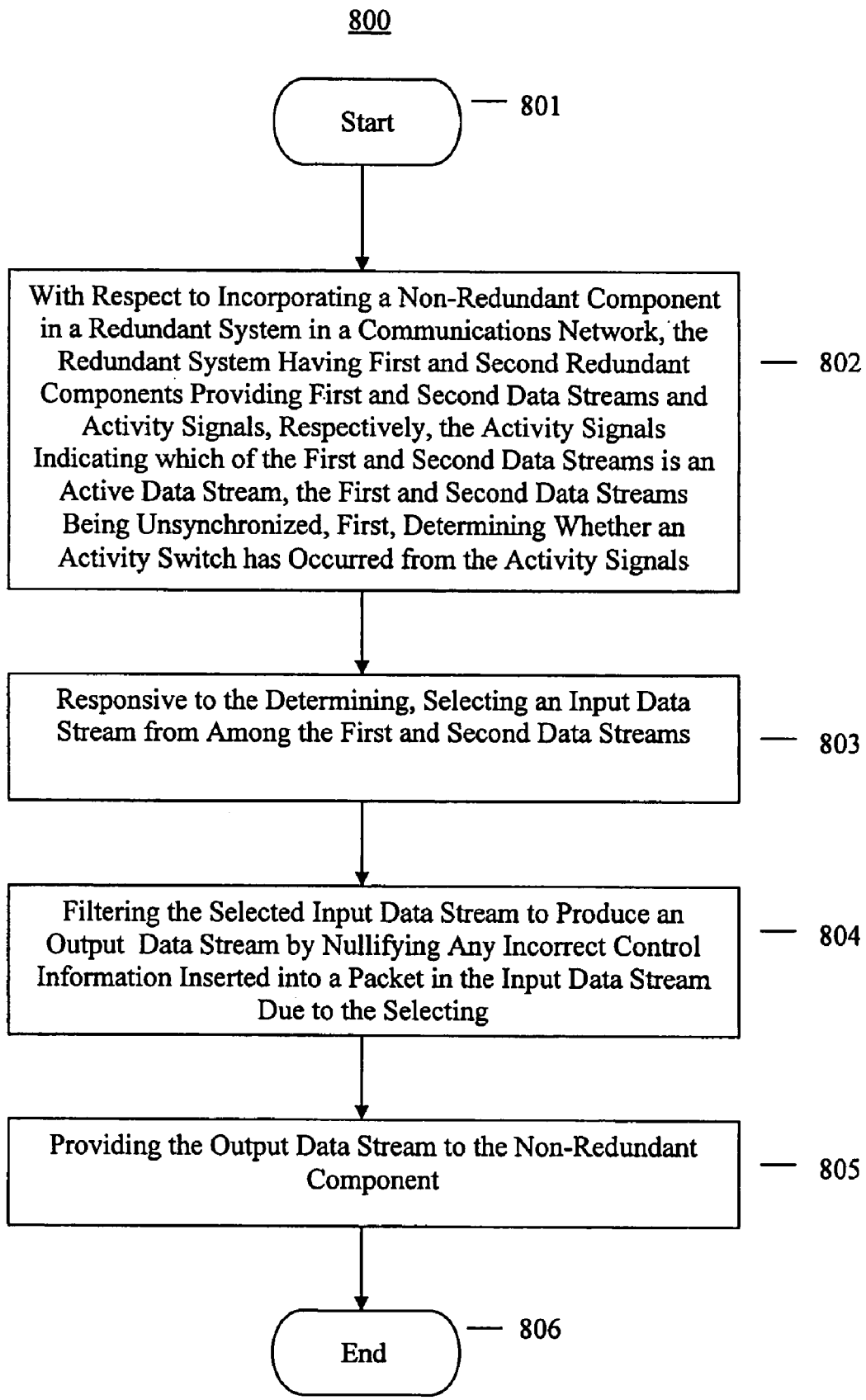
FIG. 8 is a flow chart illustrating operations of software modules within the memory of a data processing system for incorporating a non-redundant component in a redundant system in a communications network, the redundant system having first and second redundant components providing first and second data streams and activity signals, respectively, the activity signals indicating which of the first and second data streams is an active data stream, the first and second data streams being unsynchronized, in accordance with an embodiment of the invention; and, FIGS. 9-12 are block diagrams illustrating alternate configurations of a redundant system in accordance with embodiments of the invention.

The above described method may be summarized with the aid of a flowchart. FIG. 8 is a flow chart illustrating operations 800 of software modules 331 within the memory 330 of a data processing system 300 for incorporating a non-redundant component 140 in a redundant system 100 in a communications network, the redundant system 100 having first and second redundant components 110, 120 providing first and second data streams 201, 202 and activity signals, respectively, the activity signals indicating which of the first and second data streams 201, 202 is an active data stream, the first and second data streams 201, 202 being unsynchronized, in accordance with an embodiment of the invention.

At step 801, the operations 800 start.

At step 802, a determination is made as to whether an activity switch 301 has occurred from the activity signals.

At step 803, responsive to the determination, an input data stream is selected from among the first and second data streams 201, 202.

At step 804, the selected input data stream is filtered to produce an output data stream by nullifying any incorrect control information (e.g., 401, 501, 601) inserted into a packet 210 in the input data stream due to the selecting.

At step 805, the output data stream is provided to the non-redundant component 140.

At step 806, the operations 800 end.

The method may further include determining whether any incorrect control information (e.g., 401, 501, 601) has been inserted into the packet 210. The nullifying may comprise blocking one or more control indications in packets being transmitted during the activity switch 301. The nullifying may comprise, if the incorrect control information pertains to a first start of packet indication 260 followed by a second start of packet indication 260, inserting an end of packet indication 270 between the first and second start of packet indications 260. The nullifying may comprise inserting abort information in the output data stream to instruct the non-redundant component 140 to discard one or more packets 210. The nullifying may comprise, if the incorrect control information pertains to a first end of packet indication 270 followed by a second end of packet indication 270, discarding packets 210 until a start of packet indication 260 is received. The redundant system 100 may be a router, switch, or gateway. The non-redundant component 140 may be an input/output device. The non-redundant component 140 may be a buffer management device, network processor, Ethernet device, physical layer device, framer device, or first-in-first-out ("FIFO") device. And, the packet 210 may be an Internet Protocol ("IP") packet, a multiprotocol label switching ("MPLS") packet, an asynchronous transfer mode ("ATM") packet, or a packet of another cell/packet format.

Figure 9:
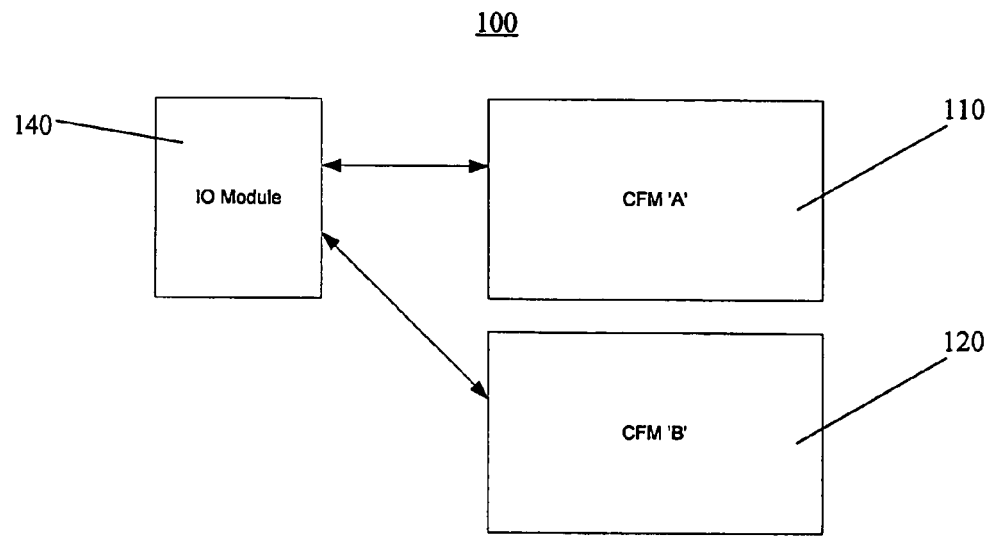

FIG. 9 is a block diagram illustrating an alternate configuration of a redundant system 100 in accordance with an embodiment of the invention. In FIG. 9, the redundant components are control and forwarding modules ("CFM") CFM 'A' 110 and CFM 'B' 120. Each CFM module 110, 120 is a main card containing all the major packet processing and control functions for the system 100. The adaptor and non-redundant component are combined in an input/output ("IO") module 140. The 10 module 140 may be either a compact media adapter ("CMA") or a media dependent adaptor ("MDA") and a MDA carrier module ("MCM"). A CMA is an interface module that allows for the connecting of different media types to a CFM. A MDA is an interface module that allows for the connecting of different media types to a CFM but that requires a MCM. A MCM is an interface card that allows MDA IO cards to connect to a CFM.

Figure 10:
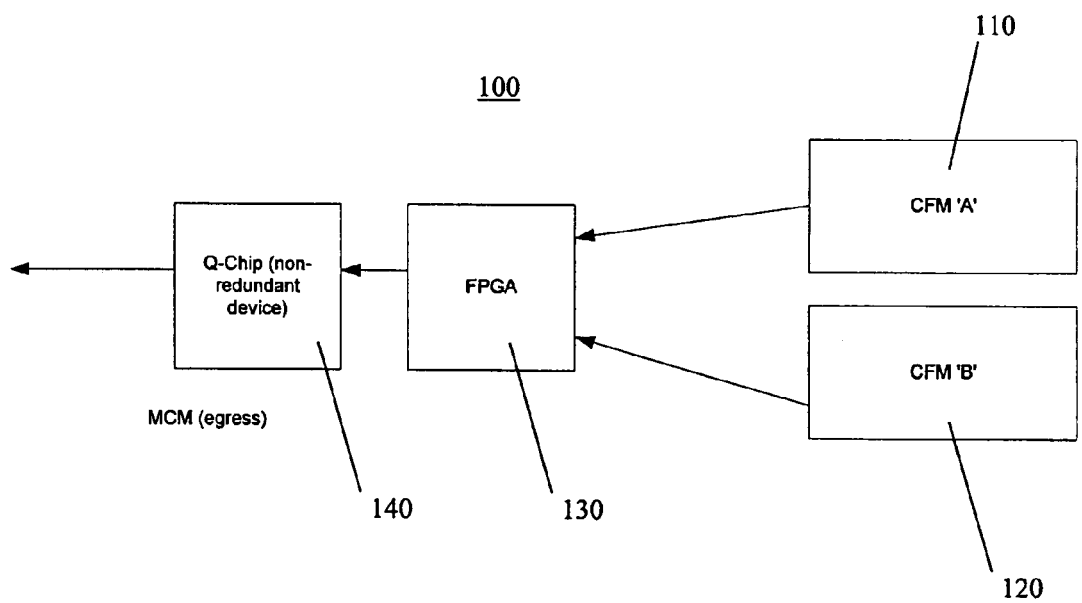

FIG. 10 is a block diagram illustrating an alternate configuration of a redundant system 100 in accordance with an embodiment of the invention. In FIG. 10, the adaptor is a field programmable gate array ("FPGA") 130 and the non-redundant component is a Q-Chip™ 140 on a MCM used for egress from the system 100. A Q-Chip™ is a proprietary application-specific integrated circuit ("ASIC") that performs buffer management and queuing functions. It is a non-redundant device.

Figure 11:
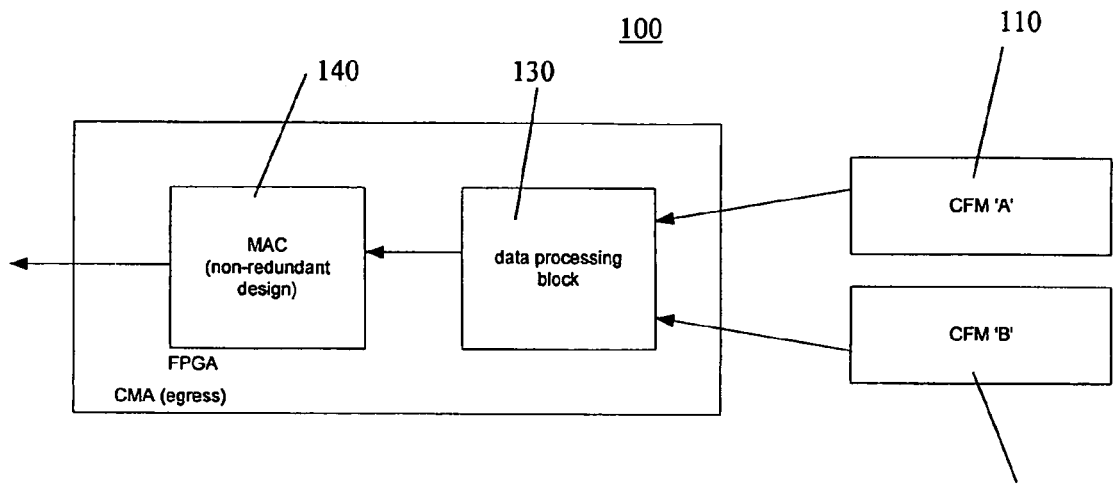

FIG. 11 is a block diagram illustrating an alternate configuration of a redundant system 100 in accordance with an embodiment of the invention. In FIG. 11, the adaptor is a data processing block 130 and the non-redundant component is an Ethernet device (i.e., having a media access control ("MAC") interface) implemented by a FPGA 140. Both the data processing block 130 and FPGA 140 are on a CMA used for egress from the system 100.

Figure 12:
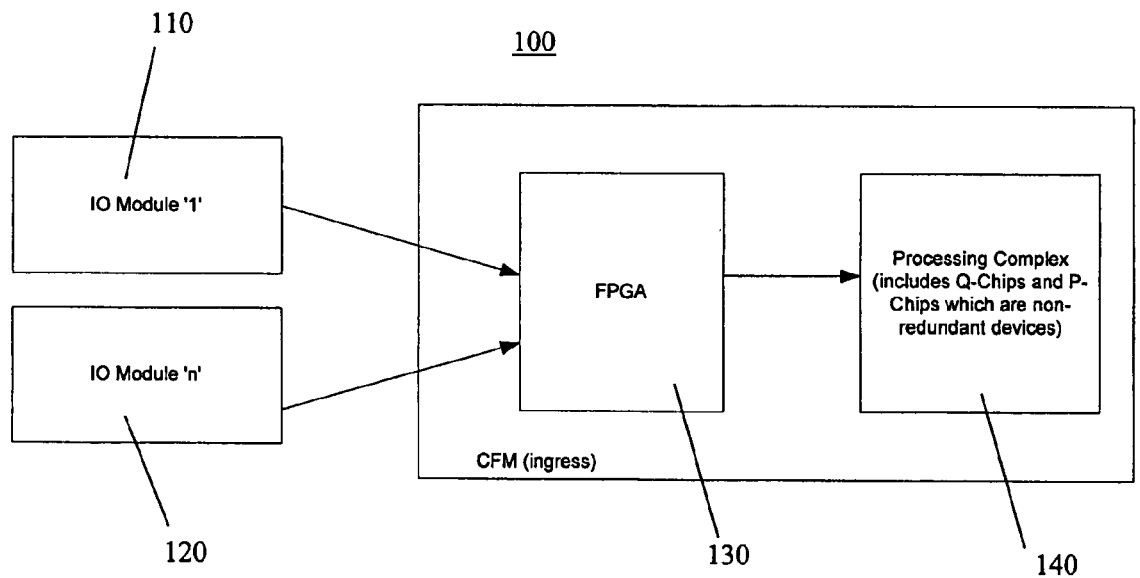

FIG. 12 is a block diagram illustrating an alternate configuration of a redundant system 100 in accordance with an embodiment of the invention. In FIG. 12, the adaptor is a FPGA 130 and the non-redundant device is a processing complex 140 including Q-Chips™ and P-Chips™, both of which are non-redundant devices. A P-Chip™ is a network processor like device that performs packet processing functions. Here, the FPGA 130 and processing complex 140 are on a CFM used for ingress to the system 100. In this embodiment, the redundant components are IO modules 110, 120.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a pre-recorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 7 can be contained in a data carrier product according to one embodiment of the invention. This data carrier product can be loaded into and run by the data processing system 300 of FIG. 7. In addition, the sequences of instructions which when executed cause the method described herein to be performed by the data processing system 300 of FIG. 7 can be contained in a computer software product according to one embodiment of the invention. This computer software product can be loaded into and run by the data processing system 300 of FIG. 7. Moreover, the sequences of instructions which when executed cause the method described herein to be performed by the data processing system 300 of FIG. 7 can be contained in an integrated circuit product including a coprocessor or memory according to one embodiment of the invention. This integrated circuit product can be installed in the data processing system 300 of FIG. 7.

The embodiments of the invention described above are intended to be exemplary only. Those skilled in this art will understand that various modifications of detail may be made to these embodiments, all of which come within the scope of the invention.

What is claimed is:

1. A method for incorporating a non-redundant component in a redundant system in a communications network, the redundant system having first and second redundant components providing first and second data streams and activity signals, respectively, the activity signals indicating which of the first and second data streams is an active data stream, the first and second data streams being unsynchronized, the method comprising:
   determining whether an activity switch has occurred from the activity signals;
   responsive to the determining, selecting an input data stream from among the first and second data streams;
   filtering the selected input data stream to produce an output data stream by nullifying any incorrect control information inserted into a packet in the input data stream due to the selecting; and,
   providing the output data stream to the non-redundant component.

2. The method of claim 1 and further comprising determining whether any incorrect control information has been inserted into the packet.

3. The method of claim 2 wherein the nullifying comprises blocking one or more control indications in packets being transmitted during the activity switch.

4. The method of claim 2 wherein the nullifying comprises, if the incorrect control information pertains to a first start of packet indication followed by a second start of packet indication, inserting an end of packet indication between the first and second start of packet indications.

5. The method of claim 2 wherein the nullifying comprises inserting abort information in the output data stream to instruct the non-redundant component to discard one or more packets.

6. The method of claim 2 wherein the nullifying comprises, if the incorrect control information pertains to a first end of packet indication followed by a second end of packet indication, discarding packets until a start of packet indication is received.

7. The method of claim 1 wherein the redundant system is a router, switch, or gateway.

8. The method of claim 1 wherein the non-redundant component is an input/output device.

9. The method of claim 1 wherein the non-redundant component is a buffer management device, network processor, Ethernet device, physical layer device, framer device, or first-in-first-out ("FIFO") device.

10. The method of claim 1 wherein the packet is an Internet Protocol ("IP") packet, a multiprotocol label switching ("MPLS") packet, an asynchronous transfer mode ("ATM") packet, or a packet of another cell/packet format.

11. A system for incorporating a non-redundant component in a redundant system in a communications network, the redundant system having first and second redundant components providing first and second data streams and activity signals, respectively, the activity signals indicating which of the first and second data streams is an active data stream, the first and second data streams being unsynchronized, the system comprising:
   a processor coupled to the non-redundant component and to the first and second redundant components; and,
   a program executed by the processor, the program including:
   a module for determining whether an activity switch has occurred from the activity signals;
   a module for, responsive to the determining, selecting an input data stream from among the first and second data streams;
   a module for filtering the selected input data stream to produce an output data stream by nullifying any incorrect control information inserted into a packet in the input data stream due to the selecting; and,
   a module for providing the output data stream to the non-redundant component.

12. The system of claim 11 and further comprising a module for determining whether any incorrect control information has been inserted into the packet.

13. The system of claim 12 wherein the nullifying comprises blocking one or more control indications in packets being transmitted during the activity switch.

14. The system of claim 12 wherein the nullifying comprises, if the incorrect control information pertains to a first start of packet indication followed by a second start of packet indication, inserting an end of packet indication between the first and second start of packet indications.

15. The system of claim 12 wherein the nullifying comprises inserting abort information in the output data stream to instruct the non-redundant component to discard one or more packets.

16. The system of claim 12 wherein the nullifying comprises, if the incorrect control information pertains to a first end of packet indication followed by a second end of packet indication, discarding packets until a start of packet indication is received.

17. The system of claim 11 wherein the redundant system is a router, switch, or gateway.

18. The system of claim 11 wherein the non-redundant component is an input/output device.

19. The system of claim 11 wherein the non-redundant component is a buffer management device, network processor, Ethernet device, physical layer device, framer device, or first-in-first-out ("FIFO") device.

20. The system of claim 11 wherein the packet is an Internet Protocol ("IP") packet, a multiprotocol label switching ("MPLS") packet, an asynchronous transfer mode ("ATM") packet, or a packet of another cell/packet format.

* * * * *